United States Patent
Bournas et al.

(10) Patent No.: US 7,660,641 B2
(45) Date of Patent: Feb. 9, 2010

(54) SYSTEM, GRAPHICAL USER INTERFACE (GUI), METHOD AND PROGRAM PRODUCT FOR CONFIGURING AN ASSEMBLY LINE

(75) Inventors: Redha M. Bournas, Chapel Hill, NC (US); Shunichi Asaka, Sagamihara (KR); Tateo Kawamura, Yamato (KR); David G. Noller, Jr., Blacksburg, VA (US); Paul D. Peters, Hyde Park, NY (US); David J. Salkeld, Raleigh, NC (US); John L. Ward, Jr., Buffalo, SC (US)

(73) Assignee: International Business Machines Corporation, Armonk, NY (US)

( * ) Notice: Subject to any disclaimer, the term of this patent is extended or adjusted under 35 U.S.C. 154(b) by 931 days.

(21) Appl. No.: 10/896,269

(22) Filed: Jul. 21, 2004

(65) Prior Publication Data

US 2006/0020357 A1 Jan. 26, 2006

(51) Int. Cl.
*G06F 19/00* (2006.01)

(52) U.S. Cl. .......................................... 700/95; 715/965

(58) Field of Classification Search .................. 700/83, 700/91, 104, 51–52, 2, 11, 23, 96; 717/164, 717/108, 166; 707/100; 706/20; 702/2, 702/13, 81, 84; 703/7, 22
See application file for complete search history.

(56) References Cited

U.S. PATENT DOCUMENTS

| | | | | |
|---|---|---|---|---|
| 5,740,425 A * | 4/1998 | Povilus | ....................... | 707/100 |
| 6,049,665 A * | 4/2000 | Branson et al. | ............. | 717/108 |
| 6,654,978 B2 * | 12/2003 | Bouchard | ........................ | 15/3 |
| 6,976,165 B1 * | 12/2005 | Carpentier et al. | .......... | 713/165 |
| 2002/0107677 A1 * | 8/2002 | Nguyen et al. | ................ | 703/13 |
| 2006/0080055 A1 * | 4/2006 | Kondo et al. | .................. | 702/84 |

* cited by examiner

*Primary Examiner*—Kidest Bahta
(74) *Attorney, Agent, or Firm*—Ayla Lari; Hoffman Warnick LLC

(57) ABSTRACT

Under the present invention, a GUI is provided that allows an assembly line to be both graphically and dynamically configured. In general, the GUI allows a designer or the like to "graphically" configure: a hierarchy of categories representing the assembly line; the process points along the assembly line; the different events that can be triggered at the process points; the actions that are taken in response to the events; the processes (sequences of actions) for the events; and the input parameters for the events and the actions. In a typical embodiment, the GUI is maintained on a system that is separate from the central computer controlling the assembly line. This not only allows the assembly line to be configured remotely, but also without ceasing operation of the line.

25 Claims, 8 Drawing Sheets

SYSTEM, GRAPHICAL USER INTERFACE (GUI), METHOD AND PROGRAM PRODUCT FOR CONFIGURING AN ASSEMBLY LINE

BACKGROUND OF THE INVENTION

1. Field of the Invention

In general, the present invention provides a system, graphical user interface (GUI), method and program product for graphically and dynamically configuring an assembly line.

2. Related Art

Assembly lines have long been used to provide an automated way to manufacture a line of goods such as automotive components, electronic components, etc. In today's world, an assembly line generally includes work "cells" that are logically referred to as "process points." Each process point performs a specific operation as a good passes through a line. For example, one process point could be responsible for painting the exterior of an automobile, while another could be responsible for putting tires on the automobile. The work performed at each process point is usually the same for all goods passing through the line. Moreover, work performed at a process point could be associated with one or more computer processes. In such cases, an operator at the process point will trigger the computer process using a device connected to a central computer that controls the line. Alternatively, the computer process could be triggered automatically as a good reaches the process point. In either event, the results of the computer process will either be returned to the process point device, stored in a local database system, or forwarded to another system.

In today's manufacturing environment, work cells and process points are statically configured with the central computer. That is, the assembly line configuration is defined before the goods are assembled, and will remain unchanged throughout the complete assembly of goods. The central computer will typically use a hard-coded file to identify requests coming from the work cells, and associate the requests with processes to perform their functions. The hard-coded file is linked with computer software to run the assembly line prior to starting the assembly of goods. Hence, if a computer device fails while executing a work cell process, it will not be possible to reconfigure the work cell to replace the failed device by an operable device and resume operation of the line. Accordingly, the current static methodology can lead to a considerable waste of time and resources.

In view of the foregoing, there exists a need to dynamically configure an assembly line of goods. A further need exists for a system to provide for the graphical configuration of the assembly line. A further need exists for the configuration of the assembly line to be separate from the central computer controlling the assembly line.

SUMMARY OF THE INVENTION

In general, the present invention provides a system, GUI, method and program product for graphically and dynamically configuring an assembly line of goods. Specifically, under the present invention, a GUI is provided that allows an assembly line to be both graphically and dynamically configured. In general, the GUI allows a designer or the like to "graphically" configure: a hierarchy of categories representing the assembly line; the process points along the assembly line; the different events that can be triggered at the process points; the actions that are taken in response to the events; the processes (sequences of actions) for the events; and the input parameters for the events and the actions. In a typical embodiment, the GUI is maintained on a system that is separate from the central computer controlling the assembly line. This not only allows the assembly line to be configured remotely, but also without ceasing operation of the line.

A first aspect of the present invention provides a system for graphically and dynamically configuring an assembly line, comprising: a tree configurator for configuring the assembly line as a hierarchy of categories; a process point configurator for configuring process points along the assembly line; an event configurator for configuring events to be triggered from the process points; an action configurator for configuring actions to be taken in response to the events being triggered; a process configurator for configuring processes associated with the events, wherein each of the processes comprises a sequenced list of the actions to be taken in response to one of the events being triggered; and a parameter configurator for configuring input parameters for the events and the actions.

A second aspect of the present invention provides a Graphical User Interface (GUI) for configuring an assembly line, comprising: a tree configuration page for configuring the assembly line as a hierarchy of categories; a process point configuration page for configuring process points along the assembly line; an event configuration page for configuring events to be triggered from the process points; an action configuration page for configuring actions to be taken in response to the events being triggered; a process configuration page for configuring processes associated with the events, wherein each of the processes comprises a sequenced list of the actions to be taken in response to one of the events being triggered; and a parameter configuration page for configuring input parameters for the events and the actions.

A third aspect of the present invention provides a computer-implemented method for graphically and dynamically configuring an assembly line, comprising: graphically configuring the assembly line as a hierarchy of categories; graphically configuring process points along the assembly line; graphically configuring events to be triggered from the process points; graphically configuring actions to be taken in response to the events being triggered; graphically configuring processes associated with the events, wherein each of the processes comprises a sequenced list of the actions to be taken in response to one of the events being triggered; and graphically configuring input parameters for the events and the actions.

A fourth aspect of the present invention provides a program product stored on a recordable medium for graphically and dynamically configuring an assembly line, which when executed, comprises: program code for configuring the assembly line as a hierarchy of categories; program code for configuring process points along the assembly line; program code for configuring events to be triggered from the process points; program code for configuring actions to be taken in response to the events being triggered; program code for configuring processes associated with the events, wherein each of the processes comprises a sequenced list of the actions to be taken in response to one of the events being triggered; and program code for configuring input parameters for the events and the actions.

A fifth aspect of the present invention provides a system for deploying an application for graphically and dynamically configuring an assembly line, comprising: a computer infrastructure being operable to: configure the assembly line as a hierarchy of categories; configure process points along the assembly line; configure events to be triggered from the process points; configure actions to be taken in response to the events being triggered; configure processes associated with the events, wherein each of the processes comprises a sequenced list of the actions to be taken in response to one of the events being triggered; and configure input parameters for the events and the actions.

A sixth aspect of the present invention provides computer software embodied in a propagated signal for graphically and dynamically configuring an assembly line, the computer software comprising instructions to cause a configuration computer to perform the following functions: configure the assembly line as a hierarchy of categories; configure process points along the assembly line; configure events to be triggered from the process points; configure actions to be taken in response to the events being triggered; configure processes associated with the events, wherein each of the processes comprises a sequenced list of the actions to be taken in response to one of the events being triggered; and configure input parameters for the events and the actions.

Therefore, the present invention provides a system, GUI, method and program product for graphically and dynamically configuring an assembly line of goods.

BRIEF DESCRIPTION OF THE DRAWINGS

These and other features of this invention will be more readily understood from the following detailed description of the various aspects of the invention taken in conjunction with the accompanying drawings in which.

Figure 1:
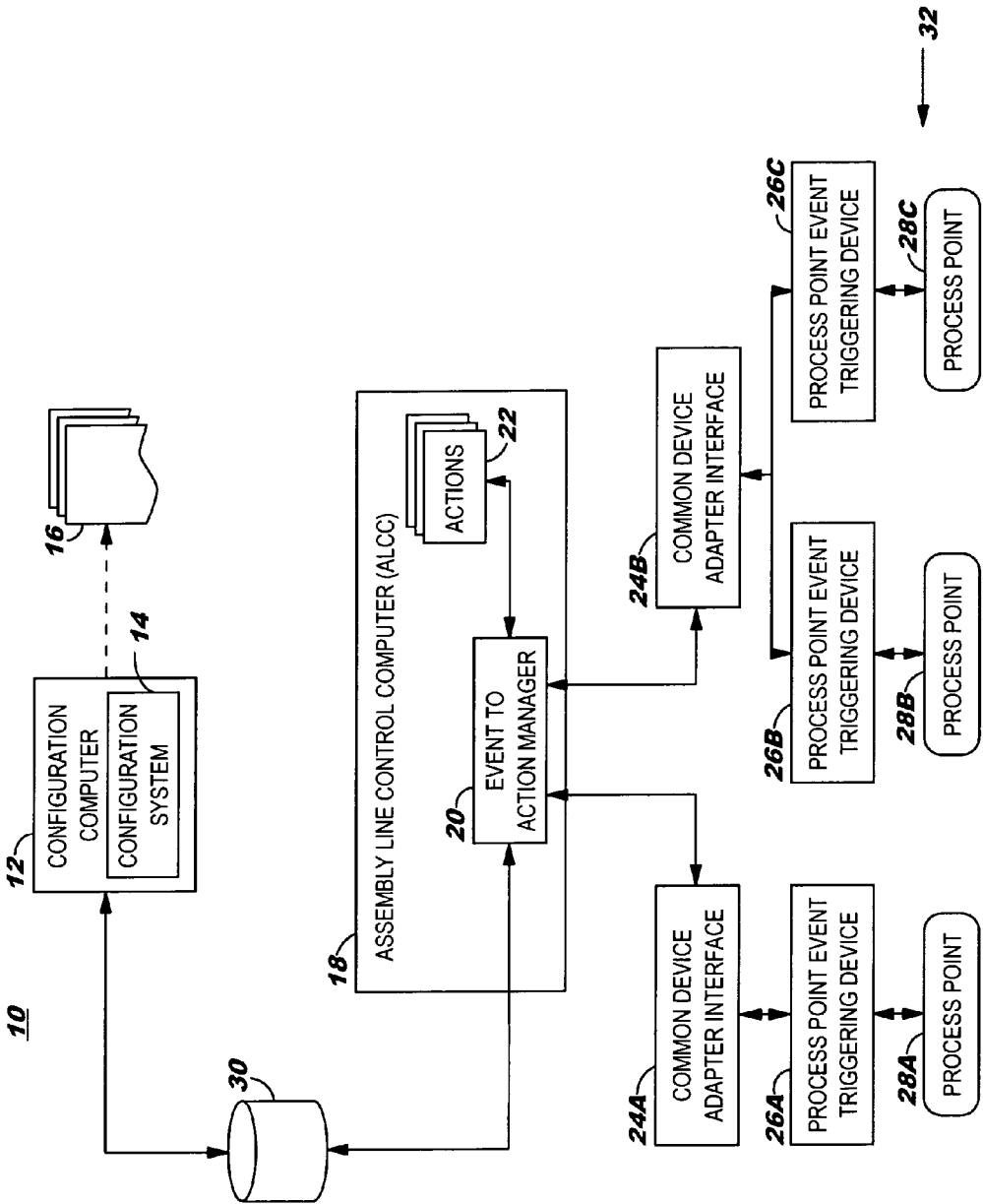
FIG. 1 depicts a system for graphically and dynamically configuring an assembly line of goods according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention will have the following sections:

I. Definitions
II. General Description
III. Computerized Implementation

I. Definitions

Under the present invention, the following terms shall have the following meanings:

Process Point—A process point is a place where manufacturing activities are performed to produce or transform a product. A process point is typically a logical location in a "shop." An assembly line is generally a collection of process points.

Event—An event is a triggered at a process point and is typically associated with a Work in Progress (WIP) movement, manufacturing activities like part installation, detection of exceptional condition, etc. An event may be triggered from a device, a person (e.g., via a terminal), a sub-system (e.g. quality information collection system), etc.

Action—An action is a function (e.g., of a Manufacturing Execution System (MES)) to support operations. It is a unit of work and, hence, any actions can be combined within a single process independently. Most actions are reusable, and are used in different process points repeatedly. For instance, the "broadcast action" is used in multiple process points to distribute the manifest papers to different shops.

Manufacturing Process (or Process)—A process is a sequential set of actions to be performed by the Assembly Line Controller (ALC) in response to a triggering event. Each process may have different set of actions Parameters—A parameter is intended to mean the input values or elements for an action or event.

II. General Description

As indicated above, the present invention provides a system, GUI, method and program product for graphically and dynamically configuring an assembly line of goods. Specifically, under the present invention, a GUI is provided that allows an assembly line to be both graphically and dynamically configured. In general, the GUI allows a designer or the like to "graphically" configure: a hierarchy of categories representing the assembly line; the process points along the assembly line; the different events that can be triggered at the process points; the actions that are taken in response to the events; the processes (sequences of actions) for the events; and the input parameters for the events and the actions. In a typical embodiment, the GUI is maintained on a system that is separate from the central computer controlling the assembly line. This not only allows the assembly line to be configured remotely, but also without ceasing operation of the line.

Referring now to FIG. 1, a system 10 for configuring an assembly line 32 is shown. As indicated above, assembly lines are typically a collection of work cells. Each work cell is logically referred to as a process point, which (as indicated above) is a place where manufacturing activities are performed to produce or transform a product. In the illustrative example shown in FIG. 1, assembly line 32 includes process points 28A-C. System 10 further includes assembly line control computer (ALCC) 18, which itself includes an event to action manager (EAM) 20. As process points 28A-C are performing their assigned tasks, certain events will occur. As known, an event is typically associated with a Work in Progress (WIP) movement, manufacturing activities, the detection of an error condition, etc. Events can be triggered in a number of ways such as by process point triggering devices 26A-C (as shown in FIG. 1 for illustrative purposes), personnel (e.g., via terminals), via sub-systems (e.g., quality information collection systems), etc. As events are triggered, they will be communicated to EAM 20 via common adapter interfaces 24A-B. As further shown in FIG. 1, multiple triggering devices 26B-C and process points 28B-C can share a common device adapter interface 24B.

Upon receiving notification of an event, EAM 20 will attempt to determine a set of actions 22 that should be taken in response. In previous systems, the events were associated with actions via a file that is hard-coded within ALCC 18. As indicated above, such a requirement meant that the system would have to be static. That is, under previous embodiments, the configuration of the hard-coded file and of assembly line 32 could only be changed by shutting down and interfacing directly with ALCC 18.

Conversely, under system 10 of the present invention, assembly line 32 is configured dynamically via configuration computer 12. That is, the configuration of assembly line 32 is provided independent of ALCC 18. To this extent, as will be further described below, configuration computer 12 includes configuration system 14 which provides a GUI (e.g., a set of interface pages) 16 for (graphically) configuring assembly line 32. This configuration can be stored in storage unit 30 for subsequent access by ALCC 18 and/or subsequent modification via configuration system 14

Figure 2:
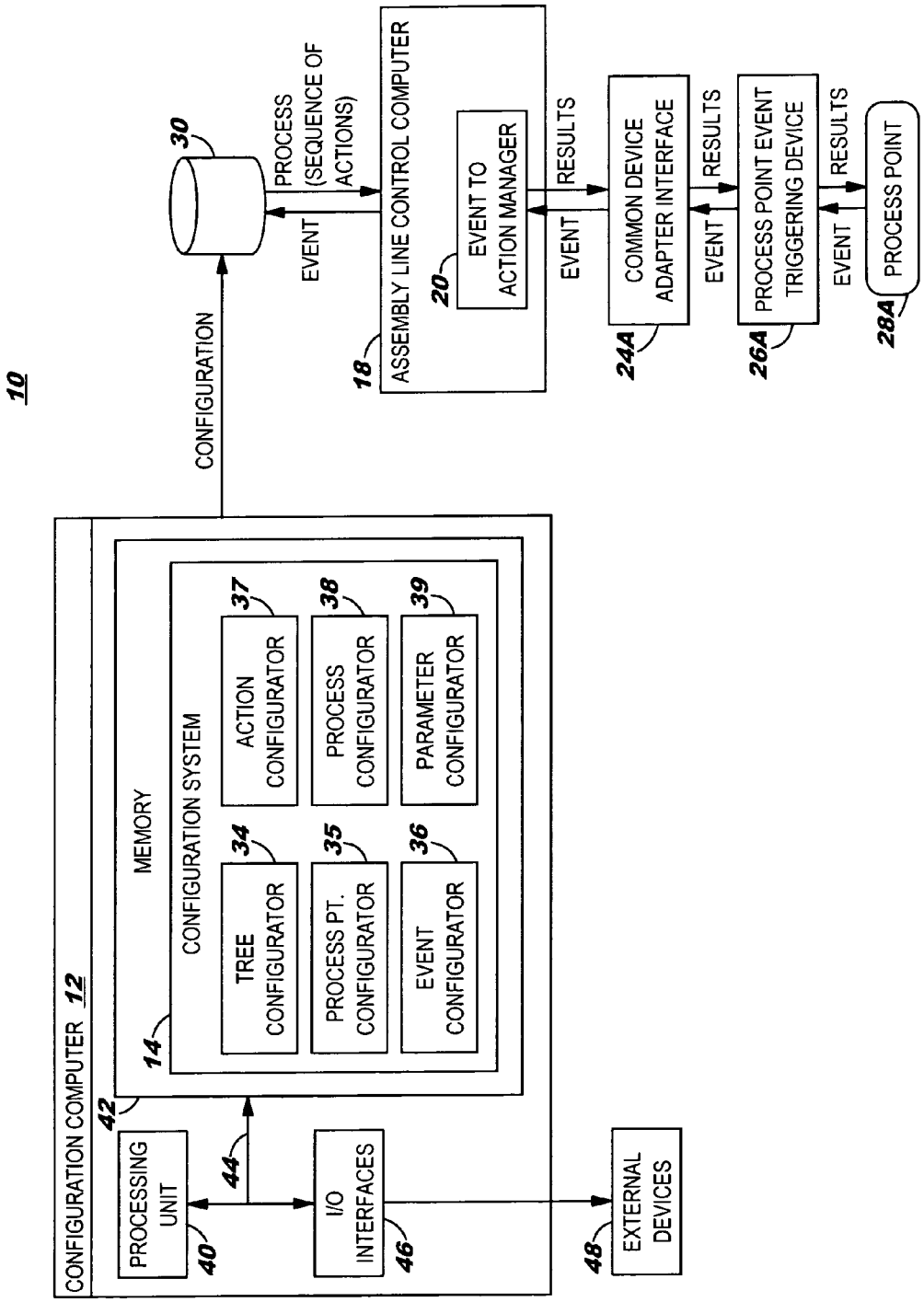
FIG. 2 depicts the configuration system of FIG. 1 in greater detail.

Referring to FIG. 2, a more detailed diagram of configuration computer 12 is shown. It should be appreciated in advance that, unlike FIG. 1, FIG. 2 depicts only a single process point 28A, process point triggering device 26A and common device adapter interface 24A for simplicity. These single elements will be used below to describe a particular illustrative example. Nevertheless, configuration computer 12 is intended to represent any type of computer that is capable of carrying out the functions of the present invention. For example, configuration computer 12 could be a desktop computer, a laptop, a workstation. Moreover, the configuration of assembly line 32 can occur on a stand-alone configuration computer or over a network. In the case of the latter, configuration computer 12 could be a client or a server. Also, the network could be any type of network such as the Internet, a local area network (LAN), a wide area network (WAN), a virtual private network (VPN), etc. Communication throughout the network could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity.

As depicted, configuration computer 12 generally includes processing unit 40, memory 42, bus 44, input/output (I/O) interfaces 46, and external devices/resources 48. CPU 40 may comprise a single processing unit, or be distributed across one or more processing units in one or more locations, e.g., on a client and server. Memory 42 may comprise any known type of data storage and/or transmission media, including magnetic media, optical media, random access memory (RAM), read-only memory (ROM), a data cache, a data object, etc. Moreover, similar to CPU 40, memory 42 may reside at a single physical location, comprising one or more types of data storage, or be distributed across a plurality of physical systems in various forms.

I/O interfaces 46 may comprise any system for exchanging information to/from an external source. External devices/resources 48 may comprise any known type of external device, including speakers, a CRT, LED screen, hand-held device, keyboard, mouse, voice recognition system, speech output system, printer, monitor/display, facsimile, pager, etc. Bus 44 provides a communication link between each of the components in configuration computer 12 and likewise may comprise any known type of transmission link, including electrical, optical, wireless, etc.

Storage unit 30 can be any system (e.g., a database, etc.) capable of providing storage for information under the present invention. As such, storage unit 30 could include one or more storage devices, such as a magnetic disk drive or an optical disk drive. In another embodiment, storage unit 30 includes data distributed across, for example, a local area network (LAN), wide area network (WAN) or a storage area network (SAN) (not shown). Although not shown, additional components, such as cache memory, communication systems, system software, etc., may be incorporated into configuration computer 12. In addition, it should be understood that control computer will likely include computerized components similar to configuration computer. Such components have not been shown for simplicity.

Shown in memory 42 is configuration system 14, which includes tree configurator 34, process point configurator 35, event configurator 36, action configurator 37, process configurator 38 and parameter configurator 39. The functions of each of these configurators will be further described below in conjunction with FIGS. 3-8. However, in general, each of these configurators typically provide at least one interface page for allowing dynamic and graphical configuration of the assembly line by an authorized configuring user or the like (not shown). As the assembly line is configured, the configuration details will be stored in one or more tables within storage unit 30 for subsequent access by ALCC 18. It should be appreciated that the manner in which configurators are shown within configuration system 14, and the order in which they are described below, is intended for illustrative purposes only and is not meant to limit the present invention. That is, the various configurators could be shown in any manner and described in any order.

Tree configurator 34 is used to define where each process fits into a hierarchy of categories, such as plant location, or assembly line zone. This hierarchical tree is a valuable representation of the integration points of the manufacturing floor with manufacturing applications such as Quality, Inspection, Material Management, Error Proofing, Replenishment, Order Management and others. Companies are desperately seeking such as a centralized integration system.

Figure 3:
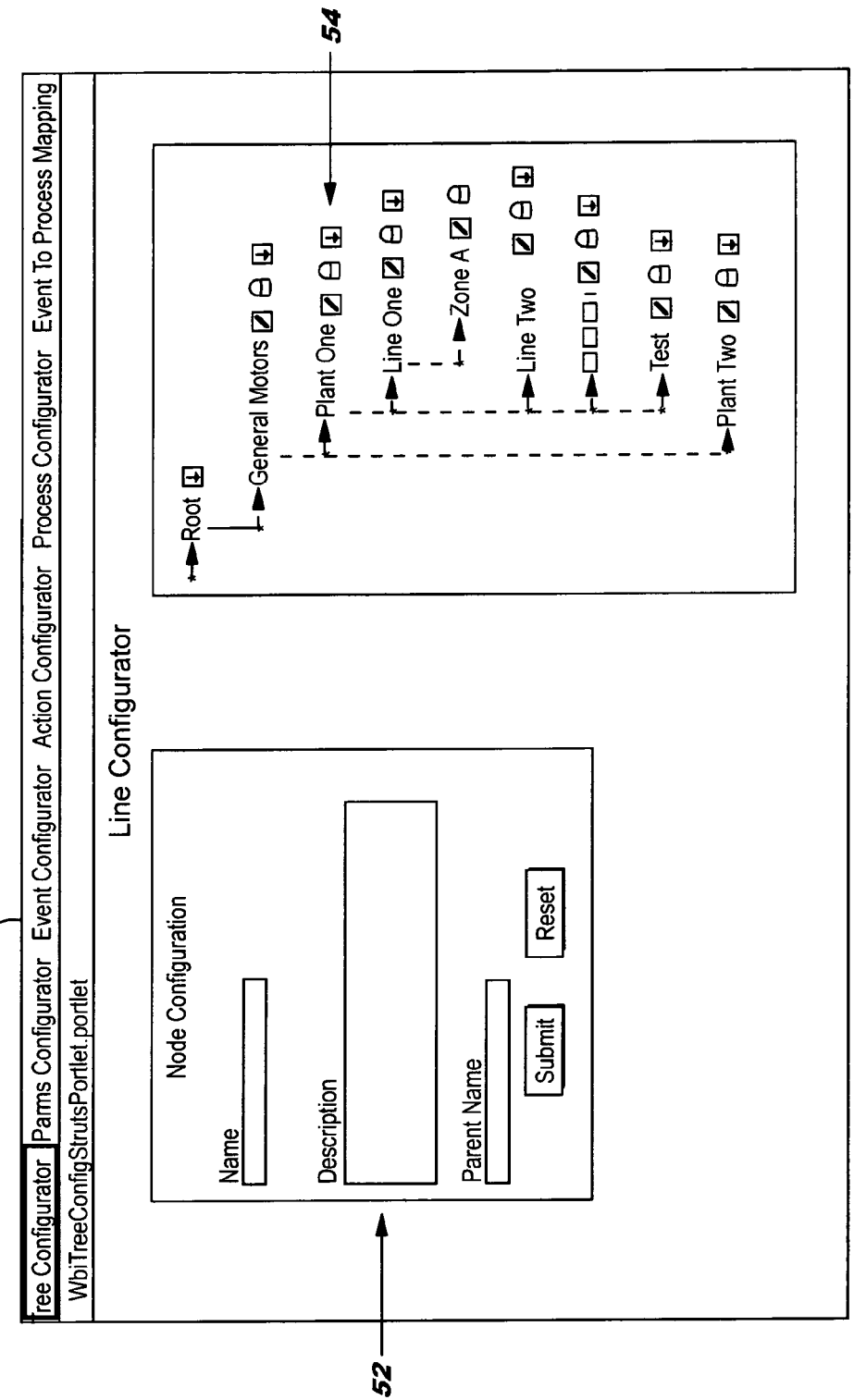
FIG. 3 depicts an illustrative interface page for configuring the assembly line as a hierarchy of categories according to the present invention.

Referring now to FIG. 3, an illustrative tree configuration interface page 50 as provided by tree configurator 34 (FIG. 2) is shown. As depicted, interface page 50 includes category portlet 52 that includes fields for configuring a category name, description and the name of the parent of the category, as well as an up to date hierarchical tree representation 54 of the assembly line. Using interface page 50, the following functions can be performed:

Creating a new category—To perform this task, the configuring user will use category portlet 52 to identify the parent of the category/node to be inserted, choose an update function and then enter the name and a description of the category.

Updating an existing category—To perform this function, the configuring user will locate the category/node to be updated in tree 54, and provide the needed updates via the name and description fields of category portlet 52.

Deleting an existing category—To perform this task the configuring user will locate the category/node to be deleted via tree 54, and select a deletion.

Figure 4:
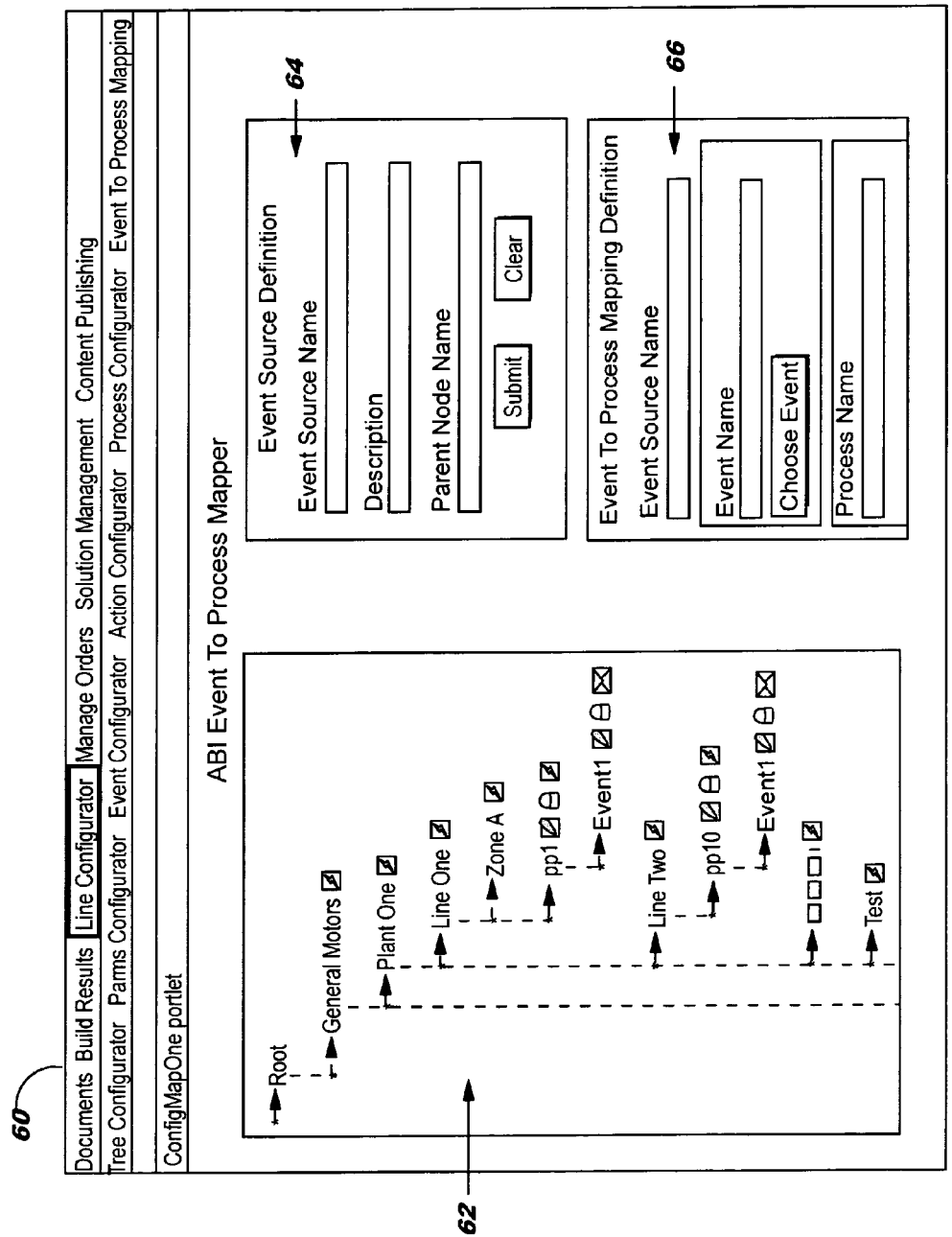
FIG. 4 depicts an illustrative interface page for configuring process points according to the present invention

Referring back to FIG. 2, process point configurator 35 allows the assembly line process points to be configured. Specifically, process point configurator 35 will provide a process point interface page to allow the associations between the events and processes at each process points to be defined. Referring now to FIG. 4, an illustrative process point interface page 60 is shown. Using interface page 60, the configuring user will define all the process points from which events can be triggered. Specifically, interface page 60 includes process tree 62, point configuration portlet 64 and mapping portlet 66 that allows the following functions to be performed:

Creating an event source—This task is also known as creating a process point. A process point can be created at any point in process tree 62 other than another event source or event category/node. To perform this task, the configuring user will first locate the category/node in process tree 62 under which a process point is desired, and invoke a "create event source" function. The configuring user will then enter the event source name (or process point name) and a description using the corresponding fields of point configuration portlet 64 to create the event source.

Defining a process point configuration—Once a process point has been created, its configuration will be defined. To perform this task, the configuring user will first locate the process point to be configured in process tree 62, and invoke an event association function. The user then selects an event from a list of the existing events in the system and a process from a list of existing processes in the system using the corresponding fields of mapping portlet 66. The user may choose to repeat these steps to associate the process point with another event and another process.

Updating a process point configuration—To perform this task, the user will first locate the process point to be updated in process tree 62 and invoke the update function. The user will then either update the event field by selecting another event from the list of the existing events in the system or the process field by selecting another process from the list of the existing processes in the system via the fields of mapping portlet 66.

Deleting an event source—Deleting an event source will also delete any event to process mappings that are defined under that event source (that is, a process point). This task is performed by locating the process point to be deleted in process tree 62 and then invoking a point deletion function.

Deleting a process point configuration—Deleting a configuration need not remove the process point itself. It could only removes any association that the process point has to any defined events or processes. To perform this task, the configuring user will first locate the process point for which the configuration is to be deleted in process tree 62, and then invoke a configuration deletion function.

Figure 5:
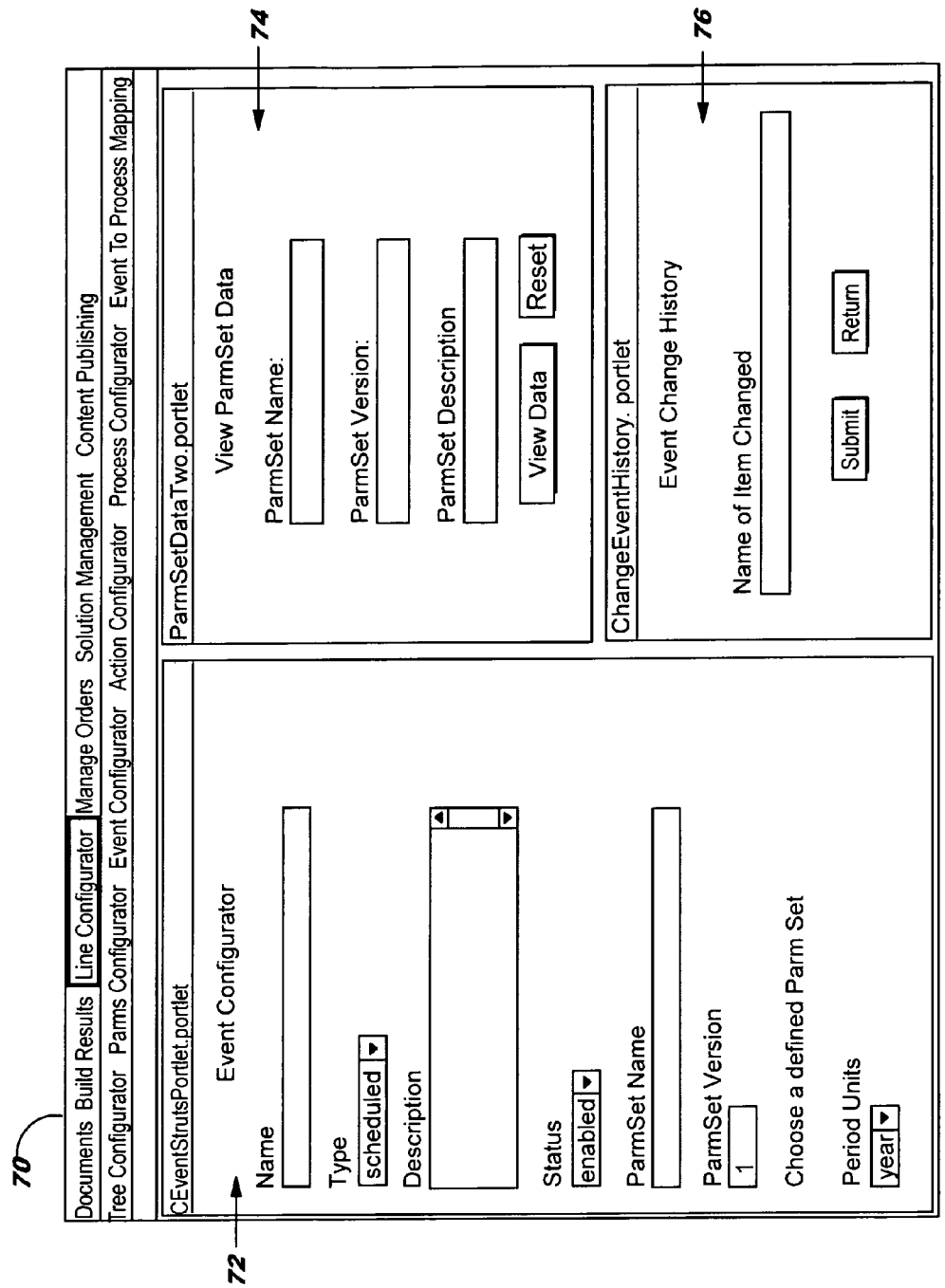
FIG. 5 depicts an illustrative interface page for configuring events according to the present invention.

Referring back to FIG. 2, event configurator 36 provides an interface page to allow the individual events to be configured. Referring to FIG. 5, an illustrative event interface page 70 is shown. As shown, interface page 70 includes event configuration portlet 72, parameter setting portlet 74 and event change history portlet 76 that allows the following functions to be performed.

Creating a new event—To perform this task, the configuring user will input the following information about the event: name, type, description, status, and input parameters using the corresponding fields of event configuration portlet 72 and parameter setting portlet 74. The type of the event is either "scheduled" or "unscheduled." An event of type "scheduled" is one that is triggered automatically at regular intervals of time. In the case of an event of type "scheduled," the user enters information about the start time of the first event trigger, the end time of the last event trigger, and the period of time. The status of the event is either "enabled" or "disabled." An event of status "disabled" will not be executed by the receiving system.

Updating an existing event—This task is performed by selecting the event to be updated from a list of existing events in the system, and then updating the entries associated with the event (as described in the "Creating an event" section above).

Deleting an existing event—This task is performed by selecting the event to be deleted from the list of existing events in the system, and then using a deletion function to delete the event.

Viewing/Maintaining event change histories—This task is performed by inputting the name of the event changed into event change history portlet 76. This allows a comprehensive change history of the events to be viewed/maintained.

Referring back to FIG. 2, action configurator 37 provides an interface page that is used to define the actions taken by ALCC 18 as the result of the events triggered at the assembly line process points. These actions are then available for inclusion in a process definition. Some benefits of this graphical representation include the re-use of defined actions in the configuration of other assembly lines, the ability to re-configure an existing assembly line or to disable an action from an existing configuration.

Figure 6:
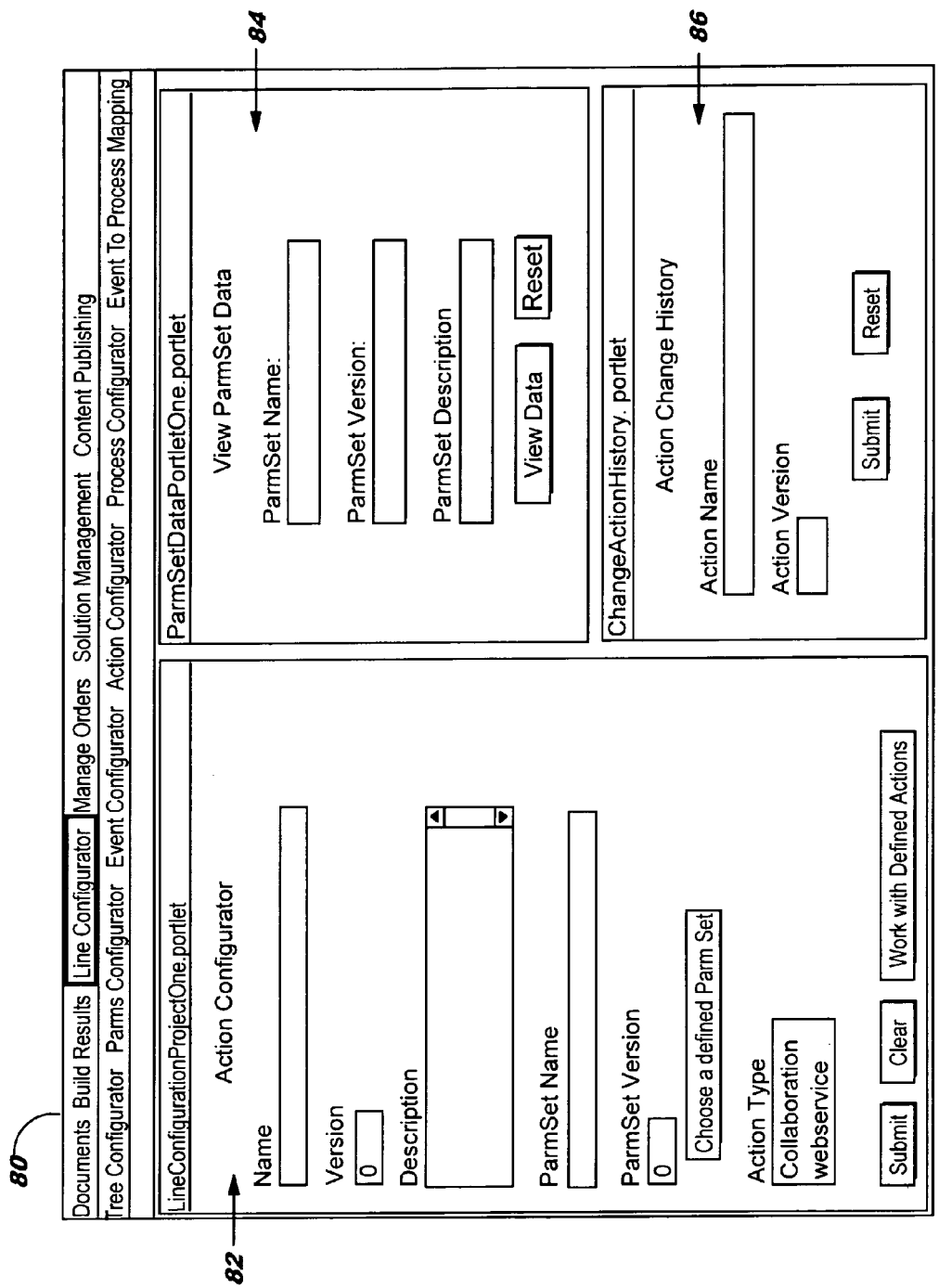
FIG. 6 depicts an illustrative interface page for configuring actions according to the present invention.

A configuring user with the appropriate authorization will define a list of all possible actions that can be taken by ALCC 18 as a result of events sent from the plant floor. The configuration of an action depends on whether it is carried out by an internal collaboration or an external web service. In either case, ALCC 18 needs to know the name of the action application to invoke. In the case of an internal collaboration, it needs to know the name of the collaboration. For an external Web service, it needs to know the name of the Web service adapter. Referring now to FIG. 6, an illustrative action 80 interface page is depicted. In general, interface page 80 includes an action configuration portlet 82, a parameter viewing portlet 84 and an action change history portlet 86 that allows the following functions to be performed Viewing parameter set data—This task is performed by inputting the corresponding information via parameter viewing portlet 84. The viewing parameter set data function enables the viewing of the data before assigning a parameter set to an action. It displays all actions that are currently using the identified parameter set. Search criteria can be designated based on the parameter set name, version, and description.

Viewing action changes—Action change history portlet 86 allows the changes made to a selected action to be viewed. When the action name is entered, this function returns and displays the changes made to the specified action. The action data is then returned and displayed.

Creating an action—This task is performed using action configuration portlet 82. The configurating user will enter the following information about the action: name, version, type, description, status, and input parameters (parameter set). The type of the action is either "Collaboration" or "Web Service." An action of type "Collaboration" is internal to the system, while an action of type "Web Service" is external to the system. For each action type, the configurating user will select the name of the procedure that ALCC 18 will invoke to process the action from a list of the existing procedures in the system.

Updating an existing action—The configuring user will perform this task by selecting the action to be updated from a list of the existing actions in the system, the configuring user will then update the entries associated with the action (as described in the "Creating an action" section above).

Deleting an existing action—To perform this action, the configuring user will first select the action to be deleted from the list of the existing actions in the system, and then use a deletion function to delete the action.

Referring back to FIG. 2, process configurator 38 is used to define the processes that are to be carried out as the result of events created by the assembly line process points. Each process contains a sequential list of actions for the ALCC 18 to take as a result of a configured event. Some benefits of this graphical representation include the re-use of defined processes in the configuration of other assembly lines, the ability to reconfigure an existing assembly line or to disable a process from an existing configuration.

Figure 7:
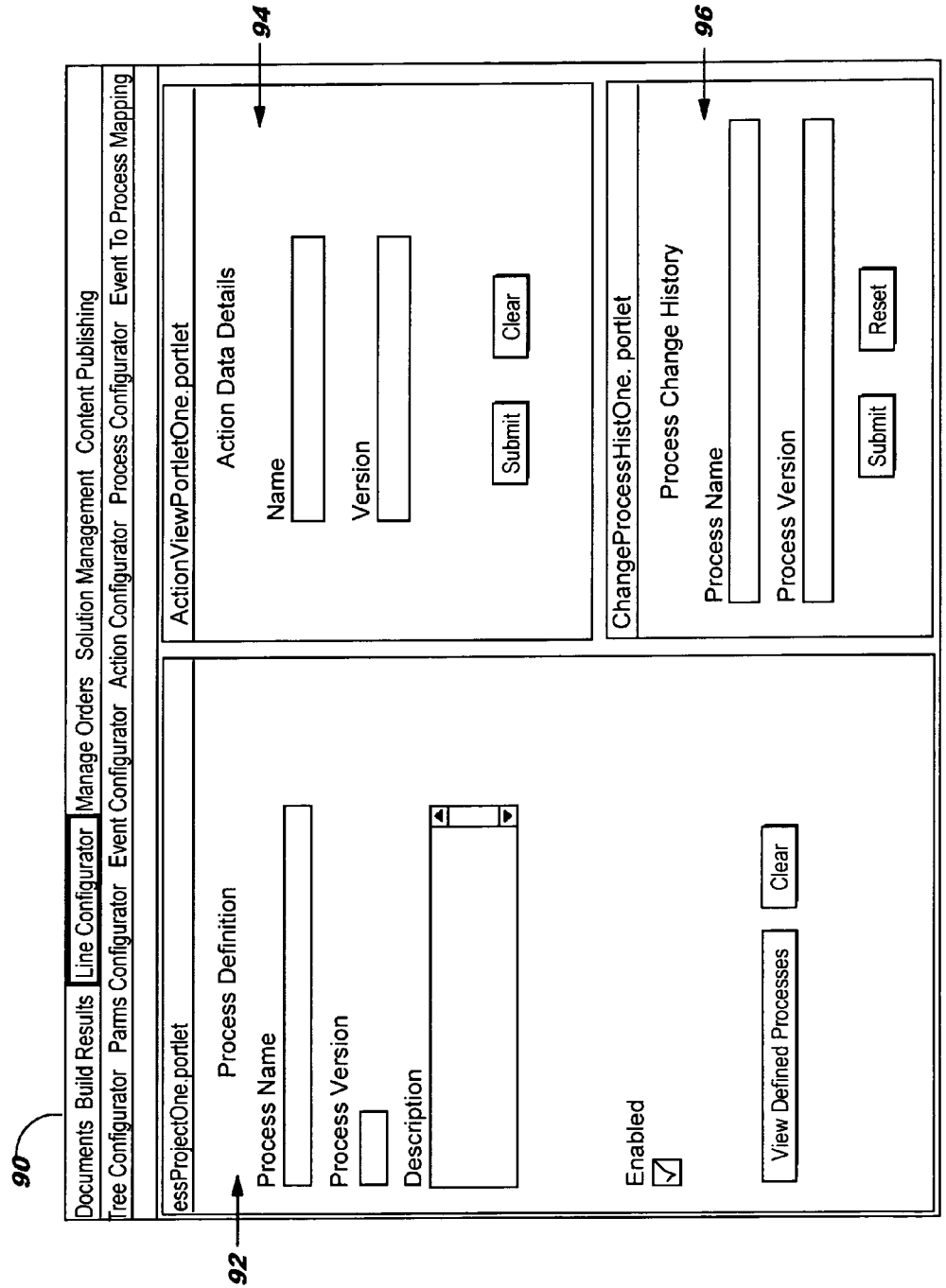
FIG. 7 depicts an illustrative interface page for configuring processes according to the present invention.

Referring to FIG. 7, an illustrative process configuration interface page 90 provided by process configurator 38 (FIG. 2) is shown. In general, interface page 90 includes process configuration portlet 92, action detail portlet 94 and process change history portlet 94 for performing the following functions:

Viewing action data details—This function enables the viewing of action data based on the action name and version as input via action detail portlet 94. Information that can be viewed includes items such as the description, the parameter set name, the parameter set version number, the collaboration name, and the collaboration verb.

Viewing the process change history—This function enables the viewing of a history of process changes based on the process name and the process version number as input via process change history portlet 96.

Creating a new process—The configuring user will perform this task on the by entering the following information about the process into process configuration portlet 92: name, version, description and whether this process is enabled. Then, the configuring user will include the actions that are to be a part of this process by selecting from a list of the existing actions in the system. The order of the actions in the process definition is the order in which the actions will be invoked by ALCC 18 (FIG. 2). This interface page 90 also provides capabilities such as removing actions from a process, and re-ordering actions within a process.

Updating an existing process—A configuring user will perform this task by selecting the process to be updated from a list of the existing processes in the system. The user will then update the process information and invoke the update function.

Deleting an existing process—A configuring user will perform this task by selecting the process to be deleted from the list of the existing processes in the system, and invoking a deletion function.

Referring back to FIG. 2, parameter configurator 39 is used to define the input parameters for the defined events and actions, which are stored as a parameter set. Some benefits provided by parameter configurator 39 include a catalog collection of parameter sets for re-use in the configuration of other assembly lines, the ability to make modifications to a parameter set definition and the ability to re-configure an existing assembly line.

Figure 8:
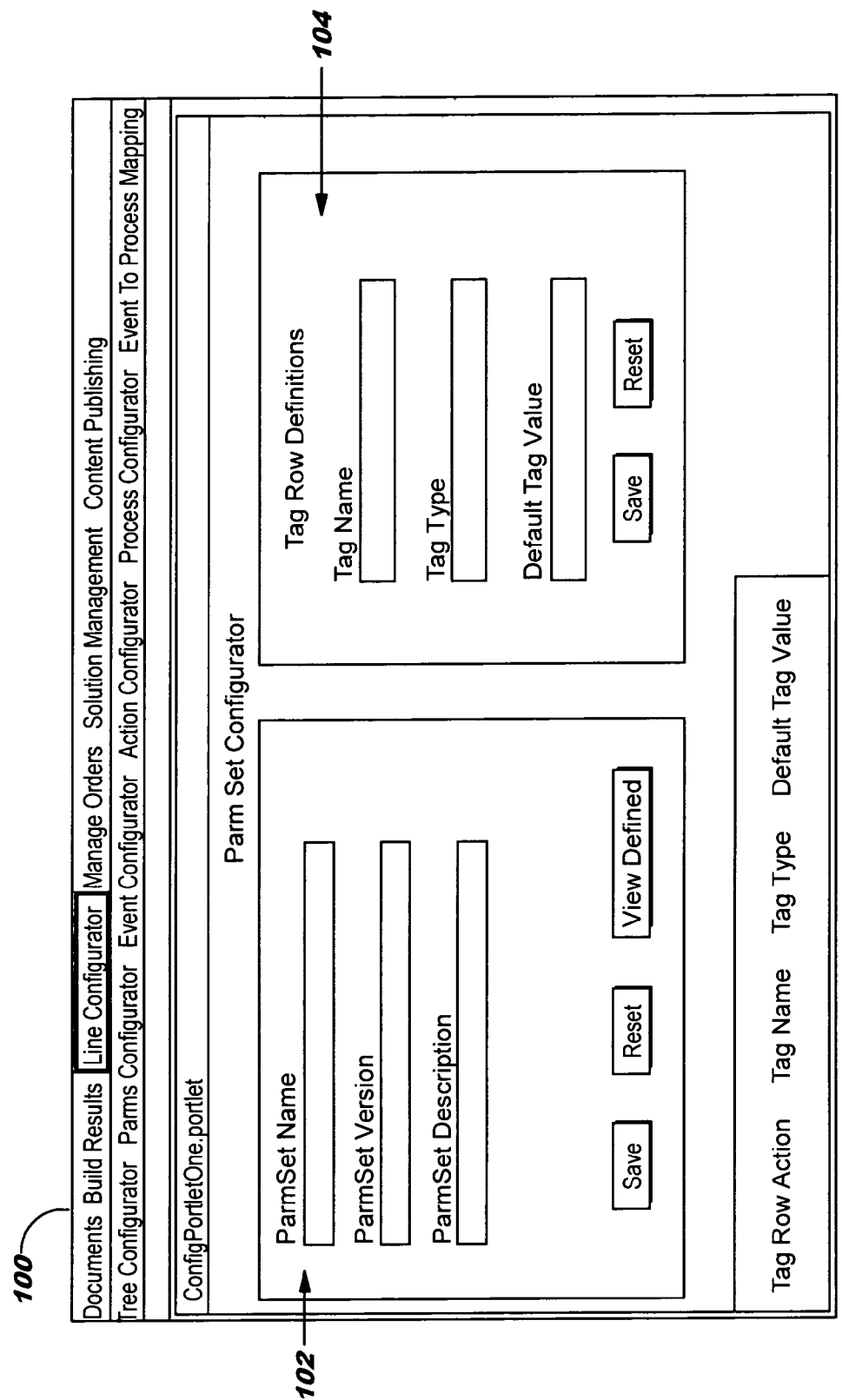
FIG. 8 depicts an illustrative interface page for configuring parameters according to the present invention.

Referring to FIG. 8, an illustrative parameter configuration interface page 100 as provided by parameter configurator 39 (FIG. 2) is shown. As depicted, interface page 100 includes, among other things, parameter set configuration portlet 102 and attribute portlet 104, which allow the following functions to be performed:

Creating a new parameter set—The configuring user will perform this task by entering the name, version and description of the parameter set via parameter set configuration portlet 102. The configuring can base the parameter set on an existing one by viewing the existing parameter sets in the system. For any other attributes that are desired the name, type, and value for each can be specified by directly editing the displayed table.

Updating an existing parameter set—The configuring user will perform this task by first viewing the list of existing parameter sets in the system and then selecting the one to be updated. The user can update the name, version, description and attributes thereof via parameter set configuration portlet 102.

Deleting an existing parameter set—The configuring user will perform this task by selecting the parameter set to be deleted, and invoking a deletion function. Before parameter set can be deleted, all references thereto by both events and actions should be removed to ensure proper running of the system.

Referring back to FIG. 2, and as indicated above, as the configuration process is being performed, the configuration details (e.g., events, actions, processes, etc.) will be stored in one or more tables within storage unit 30 for use by ALCC 18. For example, assume that the assembly line has been configured as discussed above. Further assume that an event is triggered at process point 28A via process point triggering device 26A. The event (or notification thereof) will be communicated to EAM 20 via common device interface adapter 24A. Upon receipt, EAM 20 will consult storage unit 30 to determine what actions need to be performed to address the event. To this extent, EAM 20 could identify one or more processes. As mentioned above, a process is a sequenced list of actions corresponding to a particular event. Thus, for example, event "A," could require process "Z," which is comprised of actions "1, 4, and 6" (in that order), to be performed to address the event. Once the process for addressing the event has been identified, EAM 20 will invoke the process (i.e., the actions thereof). The results can then be communicated back to process point 28A, stored in storage unit 30, communicated to another system, or any combination thereof.

It should be appreciated that the teachings of the present invention could be offered as a business method on a subscription or fee basis. For example, configuration computer 12 of FIG. 1 could be created, maintained and/or deployed by a service provider that offers the functions described herein for customers. That is, a service provider could offer to test a server environment of a customer by driving a load and analyzing the resulting performance as describe above. It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose configuration computer with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a configuration computer—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the configuration of configuration system 14 of FIG. 2 is intended to be illustrative only. As such, configuration system 14 could be represented by a different configuration of systems.

We claim:

1. A system for graphically and dynamically configuring a physical assembly line, comprising:
   a tree configurator for configuring the assembly line as a hierarchy of categories;
   a process point configurator for configuring process points along the assembly line;
   an event configurator for configuring events to be triggered from the process points;
   an action configurator for configuring actions to be taken in response to the events being triggered;
   a process configurator for configuring processes associated with the events, wherein each of the processes comprises a sequenced list of the actions to be taken in response to one of the events being triggered;
   a parameter configurator for configuring input parameters for the events and the actions, and
   a storage system for storing a completed configuration of the assembly line.

2. The system of claim 1, wherein the point configurator defines associations between the events and the processes at the process points.

3. The system of claim 1, wherein the tree configurator defines where the processes fit into the hierarchy of categories.

4. The system of claim 1, wherein the assembly line comprises a manufacturing assembly line.

5. The system of claim 1, further comprising an event to action manager for receiving a triggered event from a process point, and for determining a corresponding set of actions to be taken based on the processes.

6. The system of claim 5, further comprising a storage system for storing a catalogue of the events, a catalogue of the actions, and the processes, wherein the event to action manager accesses the storage system upon receiving the triggered event to determine the corresponding set of actions.

7. The system of claim 1, wherein the system is embodied within a graphical user interface.

8. A computer device executing a Graphical User Interface (GUI) for configuring a physical assembly line, comprising:
   a tree configuration page for configuring the assembly line as a hierarchy of categories;
   a process point configuration page for configuring process points along the assembly line;
   an event configuration page for configuring events to be triggered from the process points;
   an action configuration page for configuring actions to be taken in response to the events being triggered;
   a process configuration page for configuring processes associated with the events, wherein each of the processes comprises a sequenced list of the actions to be taken in response to one of the events being triggered; and
   a parameter configuration page for configuring input parameters for the events and the actions,
   wherein a completed configuration provided via the GUI is independent of a computer controlling the assembly line.

9. The GUI of claim 8, wherein the point configuration page allows associations between the events and the processes at the process points to be defined.

10. The GUI of claim 8, wherein the tree configuration page allows the processes to be fit into the hierarchy of categories.

11. The GUI of claim 8, wherein the assembly line comprises a manufacturing assembly line.

12. The GUI of claim 8, further comprising an event to action manager for receiving a triggered event from a process point, and for determining a corresponding set of actions to be taken based on the processes.

13. The GUI of claim 12, further comprising a storage system for storing a catalogue of the events, a catalogue of the actions, and the processes, wherein the event to action manager accesses the storage system upon receiving the triggered event to determine the corresponding set of actions.

14. A computer-implemented method performed on at least one computer for graphically and dynamically configuring a physical assembly line, comprising:
   graphically configuring on at least one computer the assembly line as a hierarchy of categories;
   graphically configuring on at least one computer process points along the assembly line;
   graphically configuring on at least one computer events to be triggered from the process points;
   graphically configuring on at least one computer actions to be taken in response to the events being triggered;
   graphically configuring on at least one computer processes associated with the events, wherein each of the processes comprises a sequenced list of the actions to be taken in response to one of the events being triggered;
   graphically configuring on at least one computer input parameters for the events and the actions; and
   outputting on at least one computer a completed configuration of the assembly line.

15. The method of claim 14, wherein the step of graphically configuring the process points comprises graphically defining associations between the events and the processes at the process points.

16. The method of claim 14, wherein the step of graphically configuring the assembly line comprises graphically fitting the processes into the hierarchy of categories.

17. The method of claim 14, wherein the assembly line comprises a manufacturing assembly line.

18. The method of claim 14, further comprising receiving a triggered event from a process point on an event to action manager, and determining a corresponding set of actions to be taken based on the processes on the event to action manager.

19. The method of claim 18, further comprising:
   storing the events, the actions and the processes in a storage system; and
   accessing the storage system from the event to action upon receiving the triggered event to determine the corresponding set of actions.

20. A program product stored on a computer-readable storage medium for graphically and dynamically configuring a physical assembly line, which when executed, comprises:
   program code for configuring the assembly line as a hierarchy of categories;
   program code for configuring process points along the assembly line where;
   program code for configuring events to be triggered from the process points;
   program code for configuring actions to be taken in response to the events being triggered;

program code for configuring processes associated with the events, wherein each of the processes comprises a sequenced list of the actions to be taken in response to one of the events being triggered;

program code for configuring input parameters for the events and the actions; and program code for outputting a completed configuration of the assembly line.

21. The program product of claim 20, wherein the program code for configuring process points defines associations between the events and the processes at the process points.

22. The program product of claim 20, wherein the program code for configuring the assembly line defines where the processes fit into the hierarchy of categories.

23. The program product of claim 20, wherein the assembly line comprises a manufacturing assembly line.

24. The program product of claim 20, further comprising an event to action manager for receiving a triggered event from a process point, and for determining a corresponding set of actions to be taken based on the processes.

25. The program product of claim 24, further comprising a storage system for storing a catalogue of the events, a catalogue of the actions, and the processes, wherein the event to action manager accesses the storage system upon receiving the triggered event to determine the corresponding set of actions.

* * * * *

UNITED STATES PATENT AND TRADEMARK OFFICE
CERTIFICATE OF CORRECTION

PATENT NO. : 7,660,641 B2 Page 1 of 1
APPLICATION NO. : 10/896269
DATED : February 9, 2010
INVENTOR(S) : Bournas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1518 days.

Signed and Sealed this

Thirtieth Day of November, 2010

David J. Kappos
*Director of the United States Patent and Trademark Office*